United States Patent [19]

Krueger et al.

[11] Patent Number: 5,505,391
[45] Date of Patent: Apr. 9, 1996

[54] STRAW SHREDDING/DISPERSING APPARATUS

[76] Inventors: Richard A. Krueger, 21001 NW. Dairy Creek Rd.; Blaine E. Thomas, 37600 NW. Shiloh La., both of Cornelius, Oreg. 97113

[21] Appl. No.: 189,578

[22] Filed: Jan. 31, 1994

[51] Int. Cl.⁶ .................. B02C 23/20; B02C 23/02; B02C 13/20
[52] U.S. Cl. .................. 241/55; 241/60; 241/186.35; 241/187; 241/223
[58] Field of Search .................. 241/55, 60, 101.7, 241/154, 187, 189.1, 193, 186.2, 186.35, 223, 56

[56] References Cited

U.S. PATENT DOCUMENTS

| | | | |
|---|---|---|---|
| 2,540,021 | 1/1951 | Wright | 241/187 |
| 2,858,080 | 10/1958 | Couchot . | |
| 2,952,493 | 9/1960 | Finn . | |
| 3,037,712 | 6/1962 | Hosokawa et al. | 241/56 |
| 3,101,759 | 8/1963 | Sterner et al. | 241/55 X |
| 3,184,172 | 5/1965 | Fitz | 241/55 X |
| 3,752,409 | 8/1973 | Lewis | 241/60 |
| 3,863,850 | 2/1975 | Freeman . | |
| 3,915,392 | 10/1975 | Kugler | 241/223 X |
| 3,969,817 | 10/1972 | Bonner et al. | 241/154 X |
| 3,972,484 | 8/1976 | Ryan . | |
| 3,999,674 | 12/1976 | Meitl . | |
| 4,083,501 | 4/1978 | Ryan . | |
| 4,109,875 | 8/1978 | Condarco et al. | 241/223 X |
| 4,151,961 | 5/1979 | Makofka et al. . | |
| 4,330,091 | 5/1982 | Rozeboom et al. . | |
| 4,449,672 | 5/1984 | Morlock et al. . | |
| 4,496,105 | 1/1985 | Feming et al. | 241/60 X |
| 4,545,716 | 10/1985 | Pearce . | |
| 4,830,292 | 5/1989 | Frey . | |
| 4,875,630 | 10/1989 | Carlson | 241/56 |
| 5,090,630 | 2/1992 | Kopecky et al. . | |
| 5,240,188 | 8/1993 | Whitmire | 241/56 X |
| 5,245,726 | 9/1993 | Rote et al. | 241/56 X |

FOREIGN PATENT DOCUMENTS 2089760  4/1981  United Kingdom .

OTHER PUBLICATIONS

Aero–Mulcher, Bowie Industries.
Reinco Power Mulcher Model M–90.
Reinco Power Mulcher Model TM7–30.
Finn Corporation 1981 Bulletin No. 82–81.

*Primary Examiner*—Timothy V. Eley
*Attorney, Agent, or Firm*—Kolisch Hartwell Dickinson McCormack & Heuser

[57] ABSTRACT

Straw shredding/dispersing apparatus shreds straw or other shreddable material into small particles and disperses the particles over land. A conveyor feeds shreddable material through a door into a housing, and into a shredder in which three sets of flail-like structure shred the shreddable material. The first two sets of flail-like structure that impact the shreddable material spin at a slower speed than the third set of such structure. A centrifugal blower sucks the shredded material through a tapered inlet, and forces the material through a directable ejector tube. The ejector tube is remotely controlled to direct both its radial and vertical orientation.

10 Claims, 5 Drawing Sheets

STRAW SHREDDING/DISPERSING APPARATUS

BACKGROUND AND SUMMARY OF THE INVENTION

The present invention relates to straw dispersing apparatus, and more specifically to apparatus usable to shred straw into small particles and to disperse the particles over land, thereby providing for erosion control.

It is necessary to provide such erosion control in construction sites, both large and small. For small construction sites, straw has been dispersed in the past by manually pulling apart bales and spreading it, or by feeding small bales into shredders, and blowing the shredded straw out of a tube. Prior art devices of this type have had a limited throughput, because, they can only handle small bales of straw (with approximate dimensions of 1 foot by 1 foot by 3 feet). Conventional systems also require human operation of a blower direction system.

Even with the relatively small amount of straw handled by prior art systems, those systems tend to clog, which requires shut-down periods and results in higher costs. Clogging results in at least two areas of conventional systems: (1) the conveyors that feed the bales of straw into the shredder, and (2) the blower that ejects the shredded straw out of the shredder.

None of the conventional dispensers is designed for high straw throughput or for covering relatively large areas of land in relatively fast periods of time. i.e. an acre of land in approximately a minute.

Accordingly, it is a principal object of the present invention to provide straw shredding/dispersing apparatus which overcomes the drawbacks of prior art systems.

One object is to provide such apparatus that allows one-person operation.

Another object is to provide such apparatus with a preselected orientation of multiple sets of straw shredding units to shred efficiently shreddable material.

Yet another object is to provide such apparatus with an inlet structured for handling large volumes of shredded material.

A still further object is to provide such apparatus with a conical inlet to a blower.

Another object is to provide such apparatus with an anti-clogging subsystem.

In brief summary, one aspect of the invention includes a straw shredding/dispersing apparatus that shreds straw or other shreddable material into small particles and disperses the particles over land. A conveyor feeds shreddable material through a door into a housing. Within the housing, the material is carried into a shredder in which three sets of shredding units, such as rotating chains, shred the shreddable material. The first two sets of such chains that impact the material rotate at a slower speed than the final, innermost set. A centrifugal blower sucks the shredded material through a tapered inlet, and forces the material through a selectively directable ejector tube. The ejector tube is remotely controlled to direct both its radial and vertical orientation.

These and other objects and advantages of the invention will be more clearly understood from a consideration of the accompanying drawings and the following description of the preferred embodiment.

DETAILED DESCRIPTION OF THE PREFERRED EMBODIMENT

Figure 1:
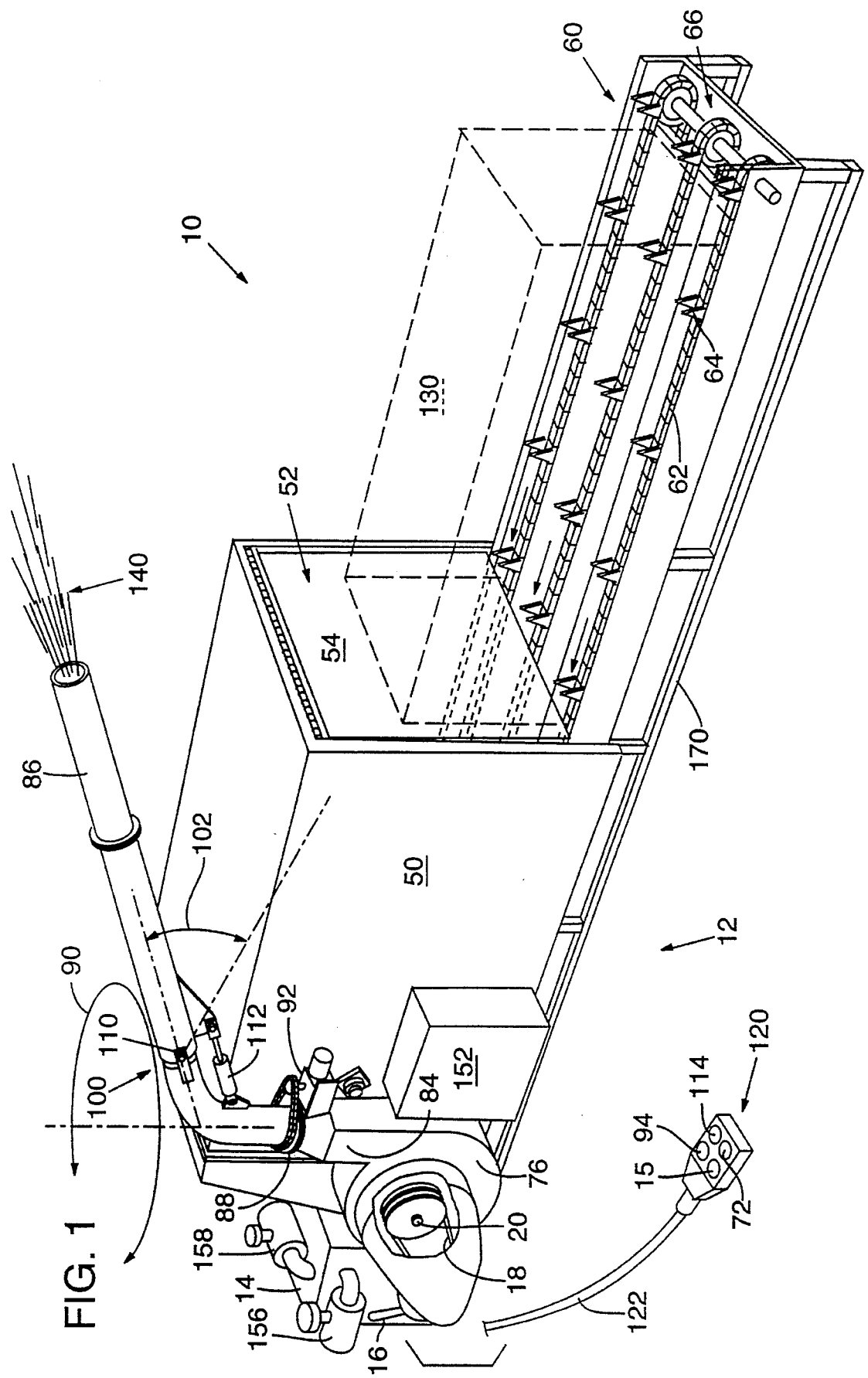
FIG. 1 is an isometric view of the preferred embodiment of the straw shredding/dispersing apparatus of the present invention.
Figure 2:
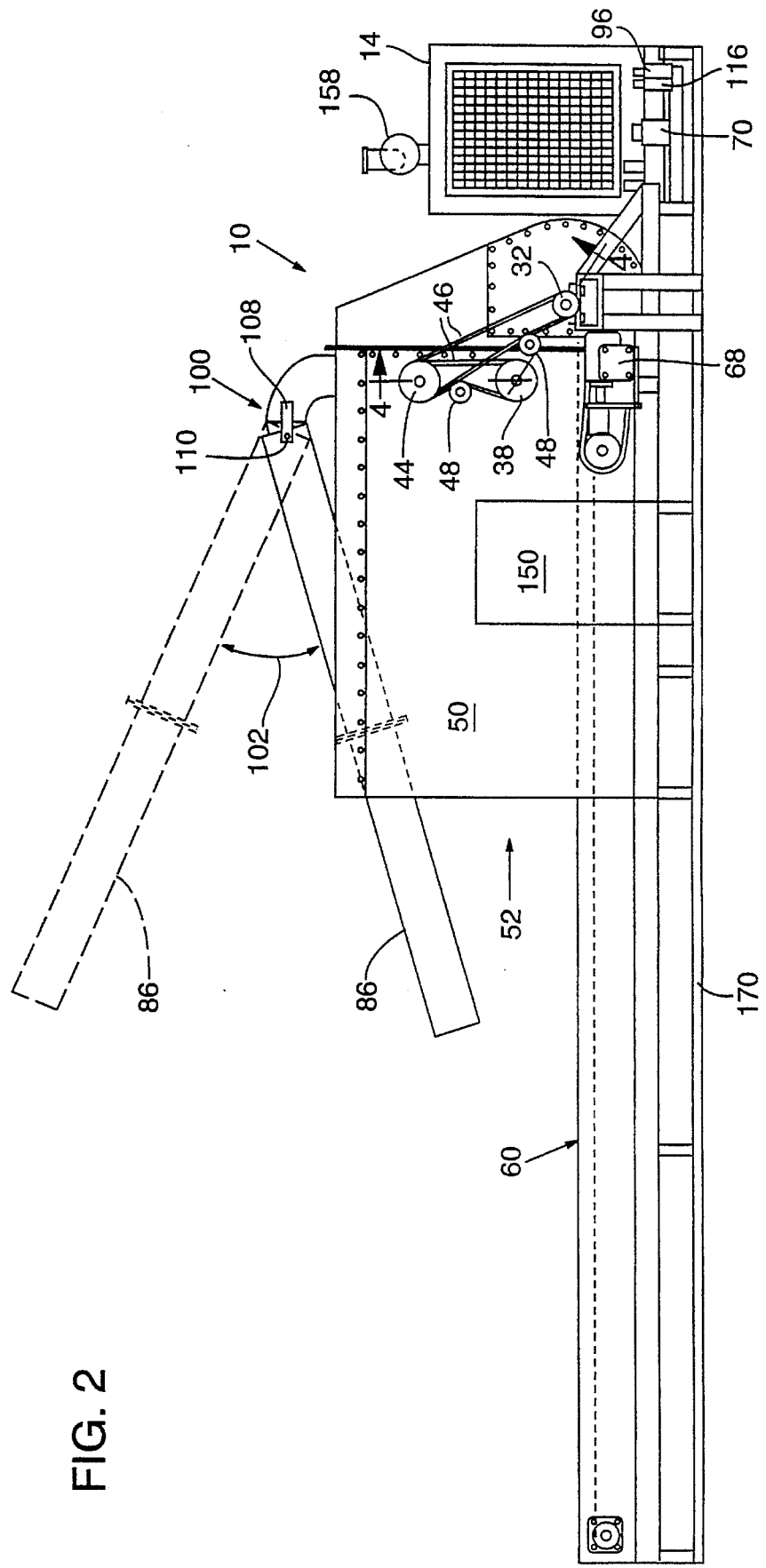
FIG. 2 is a side elevational view of the apparatus shown in FIG. 1, from the side opposite that shown in FIG. 1.
Figure 3:
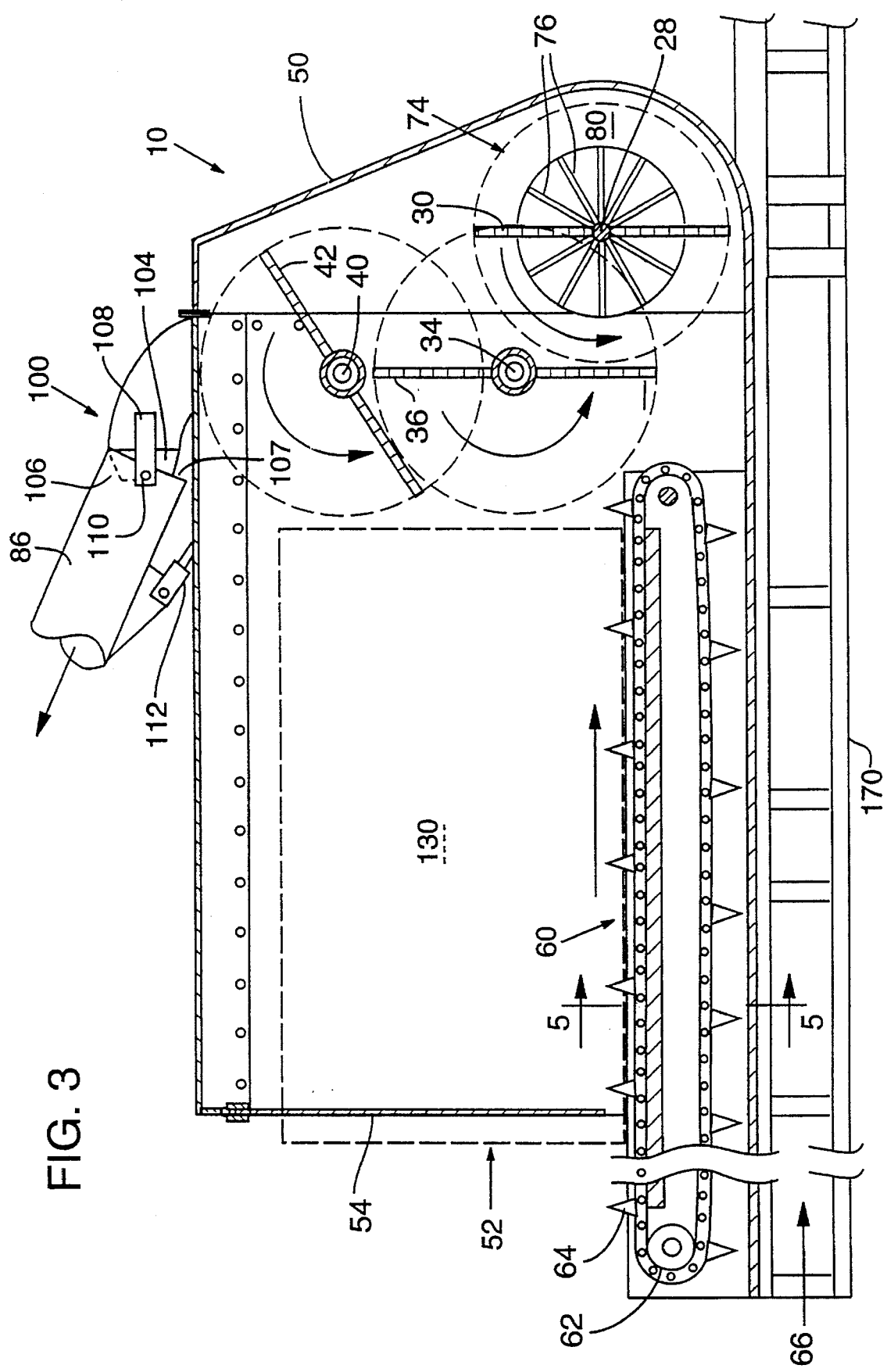
FIG. 3 is an enlarged, fragmentary side sectional view of the apparatus shown in FIG. 2.
Figure 4:
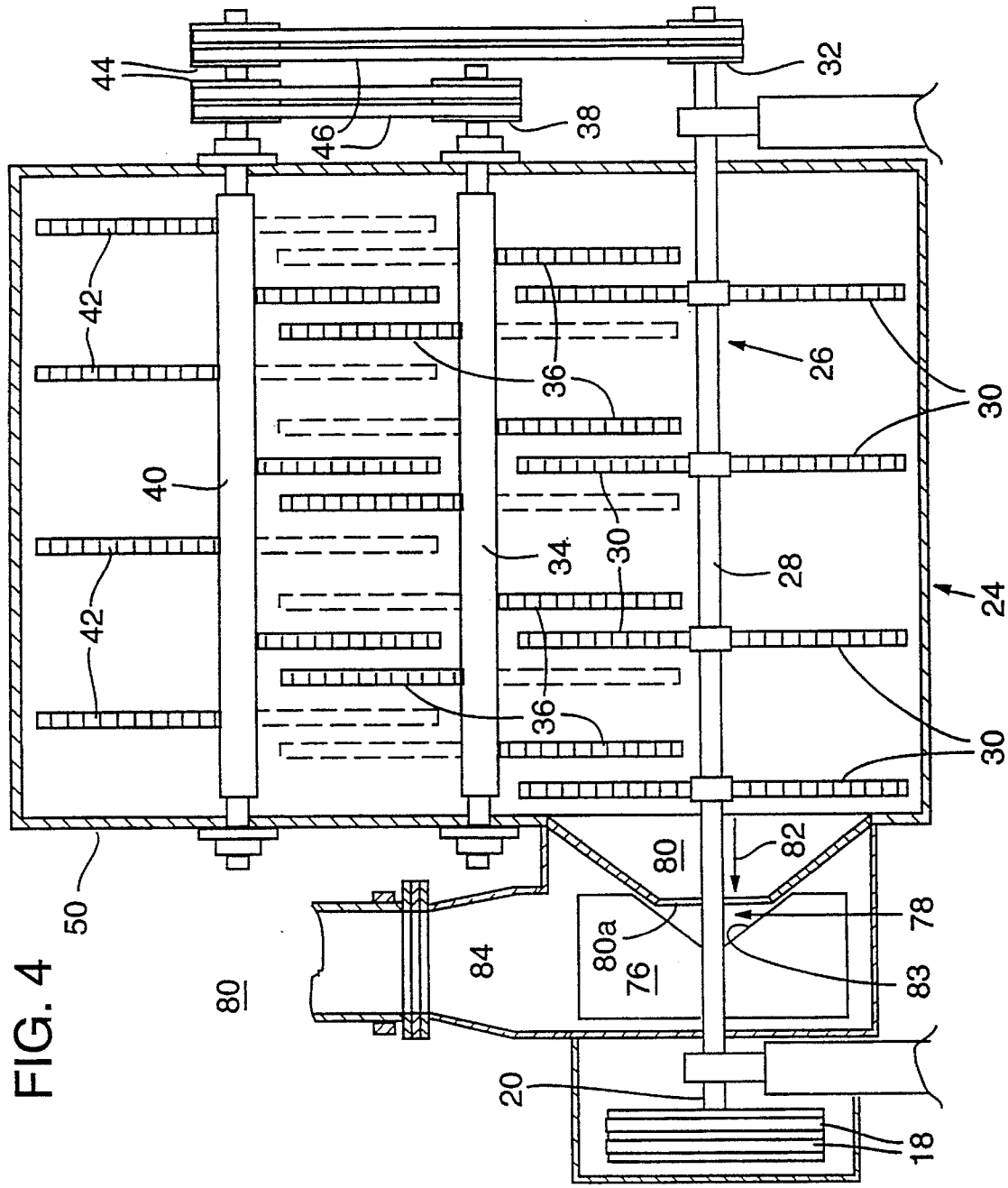
FIG. 4 is an enlarged, fragmentary sectional view through line 4—4 of FIG. 2.
Figure 5:
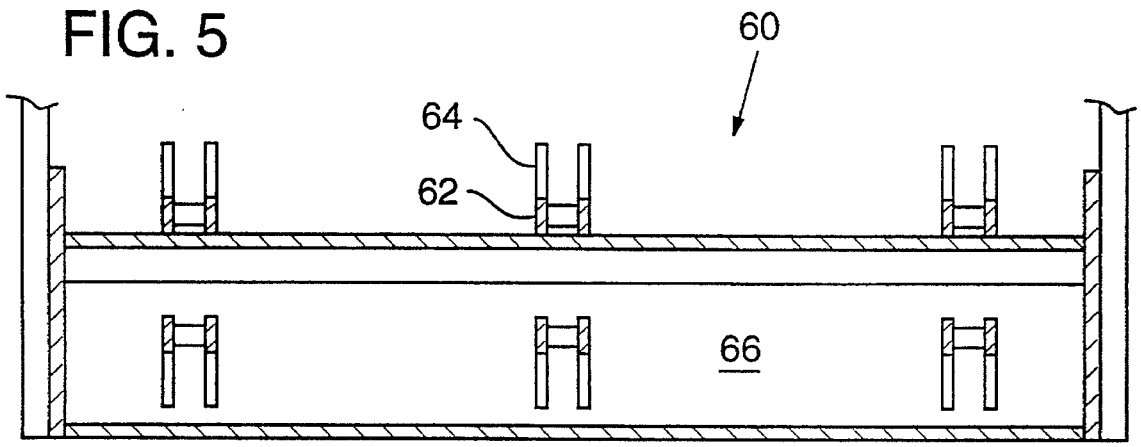
FIG. 5 is a fragmentary sectional view through line 5—5 of FIG. 3.
Figure 6:
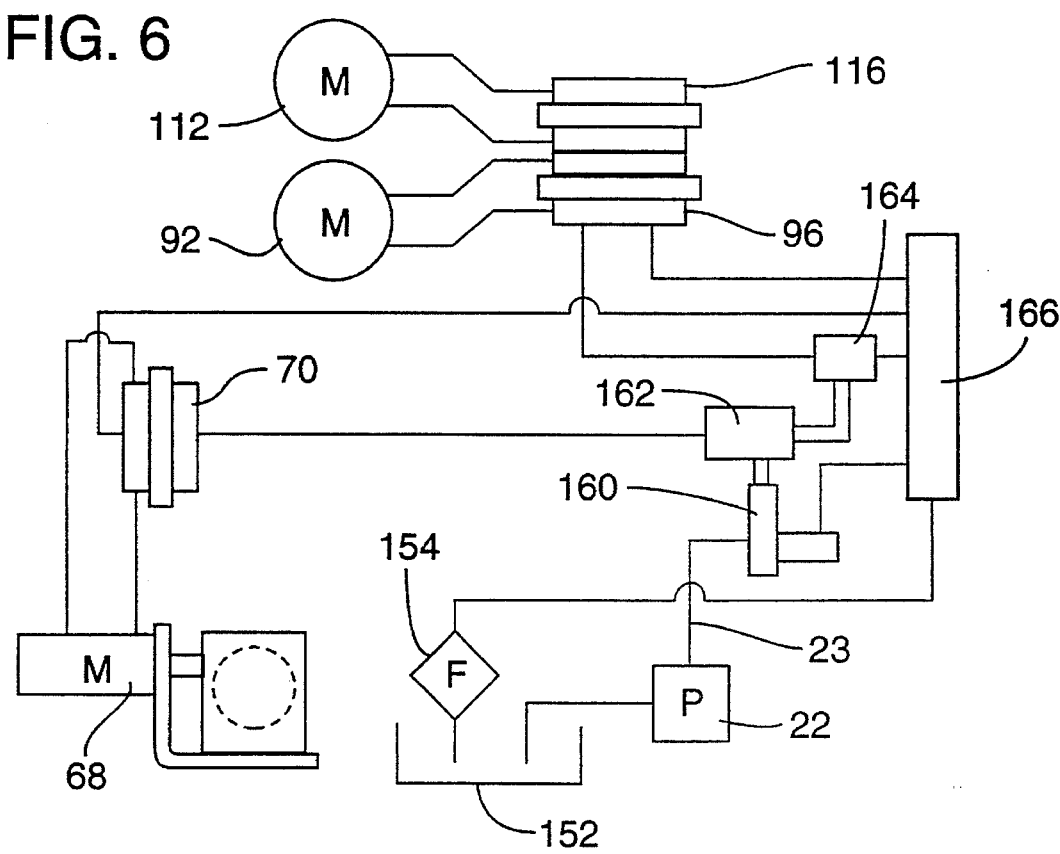
FIG. 6 is a piping diagram of the hydraulic control system of the present invention.

Referring to the drawings, and particularly to FIGS. 1–2, an automated straw dispersing apparatus, or straw spreader, is shown generally at 10. The word "straw" is used generically to refer to any shreddable material. The heart of apparatus 10 is a shredded straw feed-and-delivery assembly 12. Assembly 12 includes a source of power, preferably a diesel engine 14, controlled by a throttle 15 and connected to at least two outputs. The first output is a clutch 16, to which is connected a drive belt 18 which drives a drive shaft 20. The second output is a hydraulic pump 22, connected to hydraulic lines 23. Referring to FIGS. 2–4, assembly 12 also includes straw shredding apparatus 24, or shredder, which will now be described in more detail. Apparatus 24 includes at least one bale shredding member, or flail-like structure, 26. In the preferred embodiment, one such shredding member is a first rotating shaft 28 attached to which are a first set of flailing chains 30 and a first pulley 32. There are also preferably second and third rotating shafts 34, 40, each having a corresponding set of flailing chains 36, 42, respectively, and a corresponding pulley 38, 44, respectively, attached thereto. The flail-like structure including shaft 28, chains 30 and pulley 32 will also be referred to herein as an innermost flail-like unit, and the flail-like structure including shaft 40, chains 42 and pulley 44 will also be referred to herein as an outermost flail-like unit.

In the preferred embodiment shown in FIG. 3, first shaft 28 and second shaft 34 define a first plane and second shaft 34 and third shaft 40 define a second plane intersecting with the first plane. Thus, second shaft 34 is spaced horizontally away from and vertically above first shaft 28, and third shaft 40 is spaced vertically above second shaft 34 in substantially the same direction as second shaft 34 spaced above first shaft 28.

In another embodiment (undepicted), first rotating shaft 28, second rotating shaft 34 and third rotating shaft 40 are substantially in line with each other. Second shaft 34 is spaced horizontally and vertically from first shaft 28, and third shaft 40 is spaced horizontally and vertically from both first shaft 28 and second shaft 34 in substantially the same direction as second shaft 34 is spaced from first shaft 28.

First shaft 28, second shaft 34 and third shaft 40 are interconnected by one or more belts 46 passing over pulleys 32, 38 and 44. Belts 46 are tensed by one or more idler pulleys 48. Thus, driving any one of the rotating shafts drives the others.

In the preferred embodiment, the drive shaft is first rotating shaft 28, and first pulley 32 is smaller than both second pulley 38 and third pulley 44, so that second shaft 34 and third shaft 40 spin somewhat slower than first shaft 28. Preferably, shaft 28 rotates at about 1,400–1,900 RPM, and shafts 34, 40 rotate at about 900–1400 RPM. Straw shredding apparatus 24 may be thought of as having plural speeds, with the preferred ratio of the second speed (i.e. the speed of second shaft 34) to the first speed (i.e. the speed of first shaft 28) being in the range of about 1:1.4 to 1:1.7. In alternative embodiments, the ratio of the second speed to the first speed can be in the range of about 1:1 to 1:2.2. The ratio of the third speed (i.e. the speed of third shaft 44) to the second speed is preferably about 1:1.

Assembly 12 includes a housing 50 that encloses apparatus 24, and preferably serves as a shaft support for first shaft 28, second shaft 34 and third shaft 40. Alternatively, a shaft support can be provided in addition to housing 50. At one end of housing 50, a bale-receiving opening 52 is provided, and is substantially, releasably sealed with a weighted, flexible flap 54. Flap 54 can be made of any suitable material, including plastic, rubber and/or metal, and also can be referred to as a door. The weighting material is suitably attached to a bottom region of the flap to urge the same to remain in a substantially vertical position. Extending into housing 50 through opening 52 is a conveyor 60. In the preferred embodiment, conveyor 60 is a three-chained conveyor having three endless conveyor chains 62, and numerous teeth 64 disposed along each of chains 62. The return-portion of conveyor 60 is indicated generally at 66, and is substantially free of entangling obstacles. A conveyor motor 68, preferably a hydraulic motor controlled by a conveyor solenoid valve 70, drives conveyor 60. Solenoid 70 is in turn controlled by a conveyor switch 72.

Referring to FIG. 4, a second opening 74 is provided in housing 50, and communicates with straw shredding apparatus 24 as an outlet for shredded straw. Attached to opening 74 is a centrifugal blower 76 having a suction side 78 that communicates with second opening 74, to draw shredded straw through opening 74. In the preferred embodiment, a tapered inlet 80 is attached to second opening 74. Preferably, inlet 80 is countersunk in housing 50, as shown in cross-section in FIG. 4, and is linearly tapered, or conical with a taper region 80a. Inlet 80 is disposed with taper region 80a leading into the blower as indicated by arrow 82. A central indentation, or suction region, 83 is provided in blower 76, and is substantially conformed with inlet 80 such that central indentation 83 is a continuation of the cone shape of inlet 80. Preferably, taper region 80a extends into central indentation 83 a preselected distance to reduce the possibility of clogging due to shredded straw falling between the inlet and the blower. Presently, that preselected amount is about 1- to 2-inches.

In yet another alternative embodiment, inlet 80 is non-linearly tapered. An alternative way of describing inlet 80 is to describe it as a tapered outlet from shredder 24.

Still referring to FIG. 4, blower 76 has a pressure side 84 which is connected to an ejector tube 86. In the preferred embodiment, ejector tube 86 is movable or directable. Preferably, ejector tube 86 is radially orientable via a remotely controlled radial-orientation controller. Ejector tube 86 is provided with a radial pivot 88 that allows ejector tube 86 to travel through a horizontal arc of at least about 240 degrees, as indicated by arrow 90. The radial-orientation controller includes a radial-orientation actuator 92, preferably a hydraulic motor, a radial-orientation switch 94, and a radial-orientation solenoid valve 96. In addition to radial movement, tube 86 is also movable vertically via a vertical-orientation controller. Ejector tube 86 is provided with a vertical pivot 100 that allows ejector tube 86 to travel through a vertical arc of at least 40 degrees, as indicated by arrow 102. Vertical pivot 100 is best seen in FIGS. 2 and 3, and includes a tapered tube 104 that extends inside an overlapping outer tube 106, forming a gap 107 therebetween. The pivoting action is provided by a plate 108 that is attached to tapered tube 104, and a pin 110 that is attached to outer tube 106. Pin 110 rotates within a hole in plate 108. It has been found that the tapered tube within an outer tube allows for sufficient rotation of ejector tube 86, but without the occurrence of undesired clogging of shredded material during ejection. Furthermore, gap 107 allows for the introduction of additional air into the amount of to-be-ejected shredded material. That venting also tends to eliminate clogging. The vertical-orientation controller includes a vertical orientation actuator 112, preferably a hydraulic piston, a vertical orientation switch 114, and a vertical orientation solenoid valve 116.

For convenient single-person operation of straw spreader 10, a hand-held control panel 120 is provided, on which throttle 15, conveyor switch 72, radial orientation switch 94, and vertical-orientation switch 114 are disposed. Control panel 120 is connected to straw spreader 10 by cable 122. Cable 122 includes both a mechanical connector for throttle 15, and electrical conductors for switches 72, 94 and 114. Preferably, cable 122 is long enough to extend into the cab of a truck (undepicted) which will pull spreader 10 on a trailer (undepicted). The truck driver can then also operate all functions of spreader 10 from the truck cab.

For a more complete understanding of the present invention, shreddable material 130, preferably baled straw or hay, is shown by dashed lines in FIGS. 1 and 3. Such baled straw is available in bales measuring approximately 4 feet wide×4 feet tall×8 feet long. Shredded material 140, preferably shredded straw, is also shown being ejected from ejector tube 86 in FIG. 1.

Other elements shown in the drawings include a fuel tank 150, a reservoir for hydraulic fluid 152, a fluid filter 154 for filtering hydraulic fluid, an air filter 156 for filtering air for engine 14, and an exhaust assembly 158. Pressure regulators 160, 162 and 164 are provided for fine tuning of the remote controls, and return manifold 166 is provided for simplified connection of some of hydraulic lines 23. Furthermore, assembly 12 can be mounted on a skid 170, thus allowing the entire dispersing apparatus 10 to be removably mounted on a flatbed truck (undepicted).

From the foregoing description it will be seen that the preferred embodiment that has been described is straw shredding/dispersing apparatus used to shred, or thresh, straw or other shreddable material into small particles and disperse the particles over land. The resulting dispersed particles provide erosion control and protection for seeds that have been planted in the land. Large bales of shreddable material are fed by a conveyor through a door into a housing which contains a shredder in which three rotating shredding units, or flail-like structure, preferably in the form of chains, shred the shreddable material. The first two, upstream sets of chains that impact the shreddable material spin at a slower speed than the downstream, innermost set of chains. The speed differential between the two upstream sets and the downstream set has been found to provide for improved movement of the shredded material into the blower.

The blower sucks the shredded material out of the shredder through the tapered inlet and into the blower. The sucking action through the tapered inlet causes a funneling of the material from a larger volume area, i.e. the shredder, to a smaller volume area, i.e. the blower. The result is to handle efficiently large volumes of shreddable material without clogging the shredder or blower. The blower also creates a partial vacuum inside the housing, which is maintained by the door through which the bales of shredded hay are pushed. The resulting vacuum keeps the return portion of the conveyor free of material that might clog the conveyor.

The blower is preferably a centrifugal blower, and is provided with a tapered inlet, which has been found to improve further the movement of shredded material from the shredder into the blower. The blower forces the shredded material through a selectively directable ejector tube to aim to-be-ejected shredded material in a desired direction. The ejector tube is remotely controlled to direct both its radial and vertical orientation, thus allowing shredded material to be directed over a large area of land having varying topography. Furthermore, the vertical pivot that provides directability of the ejector tube includes a tapered tube and overlapping outer tube construction, thus tending to aid material dispension by introducing additional air into the to-be-ejected resulting jet of shredded material.

While preferred embodiments and best modes of the invention have been disclosed, variations may be made thereto without departing from the spirit of the invention.

We claim:

1. Straw shredding/dispersing apparatus comprising:

a housing having interior defining surfaces;

a shredder at least partially enclosed within the housing, and including a rotatable first shaft with a flail attached thereto:

a rotating blower having a suction end communicating with the shaft; and a tapered inlet countersunk in at least one of the surfaces of the housing, extending outwardly from that surface, and disposed between the rotating shaft and the suction end, with the inlet including a taper region leading into the blower.

2. The apparatus of claim 1, wherein the blower and the first shaft rotate at substantially the same speed.

3. The apparatus of claim 1, wherein the shredder further includes a rotatable second shaft with a flail attached thereto, and the first shaft rotates at a first speed and the second shaft rotates at a second speed slower than the first speed.

4. The apparatus of claim 3, wherein the ratio of the second speed to the first speed is between 1:1.4 and 1:1.7.

5. The apparatus of claim 1, wherein the blower is mounted on the first shaft.

6. An assembly for dispersing a suspension of shredded straw in air, comprising:

a housing having interior defining surfaces:

a shredder for shredding the straw, at least partially enclosed within the housing;

a blower having a suction region communicating with the shredder; and a tapered inlet countersunk in at least one of the surfaces of the housing, extending outwardly from that surface, and interposing the shredder and the suction region, with the inlet including a taper region leading into the blower.

7. The assembly of claim 6 wherein the tapered inlet has a conical shape.

8. An assembly for dispersing a suspension of shredded straw in air, comprising:

a shredder for shredding the straw:

a blower having a suction region communicating with the shredder; and a tapered inlet interposing the shredder and the suction region, with the inlet including a taper region leading into the blower:

wherein the suction region includes a central indentation, and the taper region extends into the central indentation.

9. The assembly of claim 8 wherein the tapered inlet has a conical shape.

10. Straw shredding/dispersing apparatus comprising:

a housing;

a shredder enclosed by the housing and including an inlet, an outlet, and plural sets of flails including an innermost set and an outermost set, with each set being spaced laterally from each other and being upwardly inclined from the innermost set to the outermost set, and with each set being actuable to thresh straw at a preselected speed;

a remote actuator/control mechanism for remotely actuating and controlling each set, and with the mechanism actuating each set at a different speed, with the innermost set actuable at a speed that is faster than the speed at which the outermost set is actuable;

a blower having a suction end communicating with the shredder; and a tapered inlet interposing the shredder and the blower, with the inlet including a taper region extending into the blower.

* * * * *